United States Patent [19]

Timmermans et al.

[11] Patent Number: 5,737,286

[45] Date of Patent: Apr. 7, 1998

[54] SYSTEM AND APPARATUS FOR RECOVERING INFORMATION FROM A RECORD CURRIER WHICH EXHIBITS VARIATIONS OF TWO DIFFERENT PHYSICAL PARAMETERS THEREOF

[75] Inventors: Jozef M. K. Timmermans, Hasselt, Belgium; Erik C. Schylander; Johannes J. Mons, both of Eindhoven, Netherlands

[73] Assignee: U.S. Philips Corporation, New York, N.Y.

[21] Appl. No.: 389,445

[22] Filed: Feb. 15, 1995

Related U.S. Application Data

[63] Continuation of Ser. No. 983,901, Dec. 1, 1992, abandoned.

[30] Foreign Application Priority Data

Dec. 2, 1991 [EP] European Pat. Off. ............ 91203147

[51] Int. Cl.$^6$ ........................................... G11B 7/095
[52] U.S. Cl. ........................... 369/44.13; 369/44.26; 369/48; 369/54
[58] Field of Search .................... 369/47–48, 53–54, 369/58, 44.13, 44.26, 275.3–275.4, 44.39, 100, 109, 111, 124; 360/133

[56] References Cited

U.S. PATENT DOCUMENTS

| | | | |
|---|---|---|---|
| 4,849,836 | 7/1989 | Kachikian | 360/133 X |
| 4,879,704 | 11/1989 | Takagi et al. | 369/48 X |
| 4,907,216 | 3/1990 | Rijnsburger | 369/44.39 |
| 4,975,898 | 12/1990 | Yoshida | 369/100 |
| 5,060,219 | 10/1991 | Lokhoff et al. | 369/48 |

FOREIGN PATENT DOCUMENTS

| | | |
|---|---|---|
| 299573 | 1/1989 | European Pat. Off. . |
| 325330 | 7/1989 | European Pat. Off. . |
| 1516285 | 7/1978 | United Kingdom . |

OTHER PUBLICATIONS

Patent Abstracts of Japan, vol. 10, No. 312, (P-509), (2368), Oct. 23, 1986, & JP 61-123026.

*Primary Examiner*—W. R. Young
*Attorney, Agent, or Firm*—Michael E. Marion

[57] ABSTRACT

An information system including a record carrier and a playback apparatus. Information has been recorded on the record carrier in the form of variations of a first physical parameter. The playback apparatus scans the record carrier by means of a transducer which is responsive to the variations of the first physical parameter. An information recovering circuit recovers the information from a detection signal received from the transducer. The record carrier also exhibits second variations of a second physical parameter, which differs from the first physical parameter, but which second variations are of a type that are detectable by the transducer. A detection circuit detects the presence of the second variations or a predetermined property thereof (e.g., that they exhibit a predetermined variation pattern) on the basis of the detection signal received from the transducer. A circuit responsive to the detection circuit enables the information recovering circuit, when the presence of the second variations or a predetermined property of the second variations is detected, causing it to recover the information.

25 Claims, 3 Drawing Sheets

SYSTEM AND APPARATUS FOR RECOVERING INFORMATION FROM A RECORD CURRIER WHICH EXHIBITS VARIATIONS OF TWO DIFFERENT PHYSICAL PARAMETERS THEREOF

This is a continuation of prior application Ser. No. 07/983,901, filed on Dec. 1, 1992, now abandoned.

BACKGROUND OF THE INVENTION

The invention relates to an information system comprising a record carrier on which information has been recorded in the form of variations of a first physical parameter, and a playback apparatus capable of scanning the record carrier by means of a transducer which is responsive to the variations of the first physical parameter and recovering the information from a detection signal received from the transducer. The invention further relates to a record carrier and a playback apparatus for use in the system.

A system of the type mentioned above is known, inter alia, as the Compact-Disc system. Normal Compact Discs play on all compatible playback apparatus. Now-a-days, recording apparatus are available for copying the information present on a read-only Compact Disc onto a recordable disc which can be played on the compatible playback apparatus.

However, some applications, for example, audio-visual games, require a so-called "closed system" in which the Compact Disc, with the software representing the audio-visual game, can only be played on special players and which cannot be copied easily by available recording apparatus.

In view of cost aspects, it is desirable that the know-how of the already existing information systems be used as much as possible. Therefore, it is desirable to amend existing information systems as little as possible in order to realize a low-cost "closed information system". In addition, it should be very difficult for third parties to copy such special discs by means of existing copying machines.

The prior art protection schemes do not meet this requirement, e.g.

rate scrambling/encryption can be copied from disc to disc with a bit copying machine;

special logical errors (to copy protect) in a main and/or subcode channel (of e.g. a Compact Disc) can also be copied with a bit copying machine;

schemes relying on the relation main/subcode channel can also be copied with a bit copying machine.

SUMMARY OF THE INVENTION

An objective of the invention is to provide a closed information system in which record carriers are used which can be copied less easily.

According to the invention, this objective is achieved by an information system as defined in the opening paragraph characterized in that the record carrier exhibits second variations of a second physical parameter, which differs from the first physical parameter, but which second variations are of a type that are detectable by the transducer, and in that the playback apparatus comprises a detection circuit for detecting a presence of the second variations or a predetermined property thereof on the basis of a detection signal received from the transducer and an enabling circuit responsive to the detection circuit for enabling the recovery of the information in the event that the presence of the second variations or the predetermined property thereof is detected.

Due to the fact that a bit copying machine usually only copies the variations of the first physical parameter (which variations represent the information recorded), the variations in the second physical parameter are not copied. Consequently, the special discs cannot be copied by the usual type of bit copying machines.

An embodiment of the information system is characterized in that the second variations exhibit a modulation pattern representing a code, that the detection circuit comprises a code recovery circuit for recovering the code from the detection signal and an activation circuit for activating the enabling circuit in response to the recovery of a predetermined code. The use of a modulation of the variations has the advantage that the presence of the variations of the second physical parameter can be detected more reliably.

A further embodiment of the information system is characterized in that the information recorded is of a type which is recoverable by a predetermined type of data processing, the code represented by the modulation pattern of the second variations indicating the type of data processing to be used for recovering the information, and the playback apparatus being provided with a circuit for setting the recovery circuit in a mode in which the predetermined data processing indicated by the code recovered is performed. This embodiment has the advantage that for recovering the information read from the record carrier the code represented by the modulation pattern must be available. Thus, the information can only be recovered by a dedicated playback apparatus which is able to recover the code. In the event that the information is encrypted or scrambled before it is recorded on the record carrier, the code preferably indicates the encryption key or the scramble method, respectively.

Although not limited to information systems in which optically readable record carrier are used, the system is particularly suitable for this type of information systems. In an optical record carrier, it is relatively simple to provide the track in which the information has been recorded with a track modulation which can be detected by the same radiation beam as used for reading the information.

An embodiment of the information system in which this is realized is characterized by a servo control circuit for controlling the scanning in order to control at least one scanning parameter to a predetermined value on the basis of a detection signal received from the radiation sensitive detector and which is affected by the second variations, the servo control circuit operates at a predetermined frequency bandwidth. The variations of the second physical parameter causes variations in the detection signal which exhibit a frequency spectrum which is located outside the bandwidth of the servo control circuit and outside the frequency spectrum of the signal variations caused by the variations of the first physical parameter.

The variations in the second physical parameter can be in the form of variations in the track position in a direction transverse to the track direction. These variations can be detected on the basis of a tracking error signal.

The variations in the second physical parameter can be in the form of variations in the position of the plane in which the optically readable marks are located. In that event, the variations can be detected on the basis of a focus error signal.

The variations in the second physical parameter can also be in the form of variations in the mean value of the optical readable marks and the intermediate areas located between the optically readable marks. In that event, the variations in the second physical parameter can be detected on the basis of variations in a data clock signal recovered during the scanning of the track with a constant linear velocity.

In the event that the record carrier used in the information system is a Compact Disc, it is preferable to use an information system which is characterized in that the variations in the second physical parameter result in variations in the detection signal with a frequency substantially corresponding to 22 kHz when the track is scanned with a scanning speed between 1.2 to 1.4 meter per second. This embodiment has the advantage that it is impossible to copy the special disc on a usual recordable Compact Disc which is provided with a pregroove which exhibits a wobble resulting in a tracking error with a frequency of substantial 22 kHz when the pregroove is scanned with a velocity between 1.2 and 1.4 meter per second. Even in the event that it succeeds in recording the wobbling pattern of recording marks which corresponds to the wobbling recording marks of the record carrier to be copied, this pattern will not be detectable because of the presence of the wobbling pregroove which is situated in the same frequency range.

BRIEF DESCRIPTION OF THE DRAWINGS

Embodiments of the invention will now be described in more detail, by way of example, with reference to the drawings; wherein.

DESCRIPTION OF THE PREFERRED EMBODIMENTS

Figure 4:
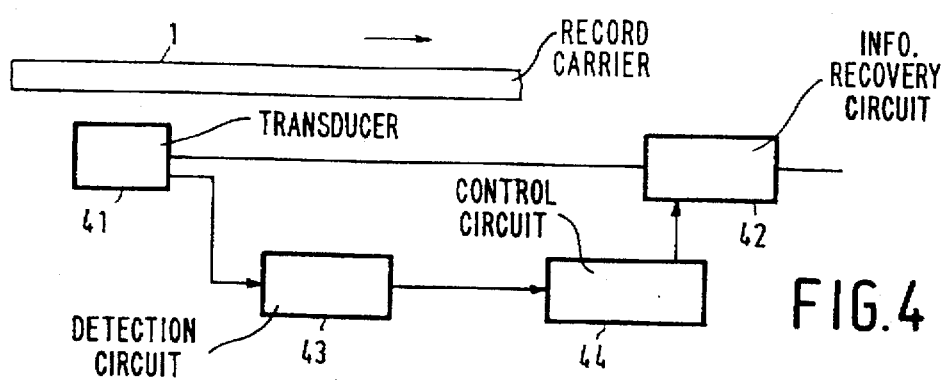
FIGS. 4 and 5 show embodiments of the information system according to the invention.

FIG. 4 shows an embodiment of the information system in accordance with the invention. The information system includes a device (not shown) which moves a record carrier 1 along a transducer 41, so as to cause the record carrier 1 to be scanned. The record carrier exhibits variations of a first physical parameter, which variations represent information recorded on the record carrier 1. The transducer 41 is of a type that is responsive to the variations of the first physical parameter. An information recovery circuit 42 is coupled to an output of the transducer 41 for receiving a detection signal corresponding with the variations of the first physical parameter on the scanned part of the record carrier 41. The information recovery circuit is of a usual type that recovers the information from the detection signal received.

The record carrier 1 further exhibits variations of a second physical parameter which variations do not represent the information represented by the variations of the first physical parameter. The second variations, however, are also detectable by the transducer 41. The transducers supplies to a detection circuit 43 a signal corresponding with the variations in the second physical parameter detected by the transducer 41. The detection circuit 43 supplies to a control circuit 44 a control signal indicating whether the detection signal received comprises signal parts (i.e. a predetermined property of the second variation) which correspond with predetermined variations of the second physical parameter. In response to the receipt of a control signal indicating that the detection signal comprises parts corresponding to the predetermined variations, the control circuit 44 supplies to the information recovery circuit 42 an enabling signal for enabling the information recovery. Only when the presence of the variations, in particular, the predetermined variations of the second physical parameter are detected will the information recorded on the disc be recovered. The information recorded on a copy of the record carrier, which copy only exhibits the variations in the first physical parameter, i.e., representing the information, cannot be recovered.

Figure 1A:
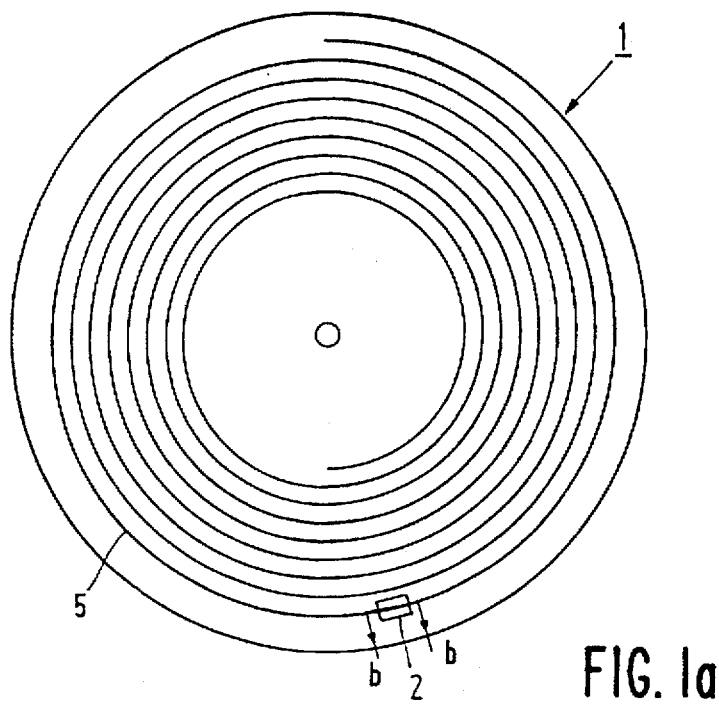
FIGS. 1a–1d, 2 and 3 show embodiments of record carriers for use in the information system according to the inventions.
Figure 1B:
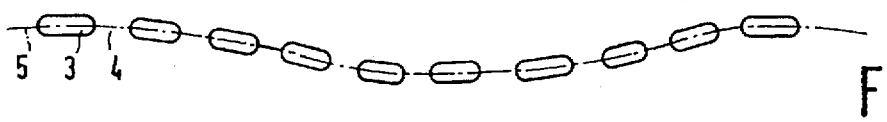
Figure 1C:
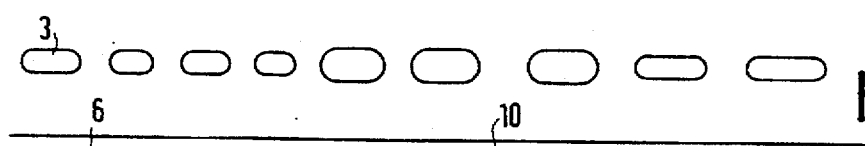
Figure 1D:
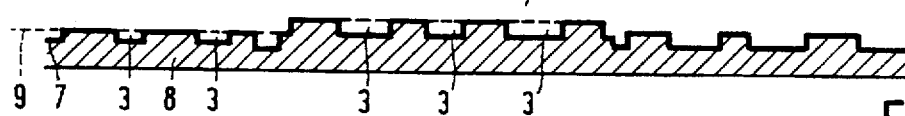

FIGS. 1a–d show possible embodiments of a record carrier 1 for use in the information system in accordance with the invention, FIG. 1a being a plan view, FIGS. 1b and 1c being highly enlarged plan views of a part 2 of a first and second embodiment of the record carrier 1, and FIG. 1d showing a small part of a sectional view of the part 2 along a line b—b of a third embodiment of the record carrier 1.

In the embodiment of the record carrier 1 shown in FIG. 1b, the variations in the first physical parameter have the form of optical detectable marks 3 which alternate with intermediate areas 4. The optically detectable marks may be in the form of so-called pits. However, other type of optically detectable marks are also suitable The optically detectable marks are arranged along a track of which the center line is indicated by a reference sign 5. In this embodiment, the variations in the second physical parameter are variations of the track position in a direction transverse to the track direction. This position variation has the form of a track undulation, also known as a radial track wobble. Such track wobble can easily be detected by the same beam scanner as used for the detection of the optically detectable marks 3 as will be discussed in another part of the description.

In the embodiment shown in FIG. 1c, the variations of the second physical parameter have the form of variations of the width of the optical detectable marks 3. The variations in the width of marks 3 result in an additional intensity modulation in a radiation beam scanning the track. Both the variations in the width of the marks 3 and the information can be recovered on the basis of the intensity modulation, provided that the frequency spectrum of the component caused by the pattern of marks (i.e., the information) does not overlap the frequency spectrum of the component caused by the mark width variations (i.e., the variations of the second physical parameter).

In FIG. 1d, the reference sign 6 indicates a transparent substrate. The substrate 6 is covered with a reflective layer 7. The reflective layer 7 is covered by a protective layer 8. The substrate 6 is provided with optically detectable marks 3 in the form of pits. The variations in the second physical parameter are in the form of variations of the position of the plane in which optically detectable marks 3 are situated. In FIG. 1d, different positions of these planes are indicated by lines 9 and 10. When scanning the pattern as shown in FIG. 1d with a focused radiation beam, the variations in the plane of the marks 3 result in a focus error which can be detected easily.

Figure 2:
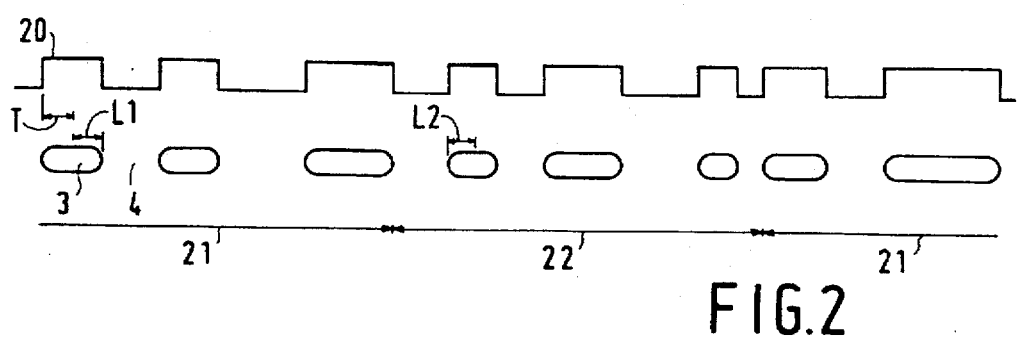

FIG. 2 shows the pattern of optically marks 3 and intermediate areas 4 for a fourth embodiment of the record carrier 1 for use in the information system according to the invention. The lengths of the marks 3 and the intermediate areas 4 correspond with a plurality (including one) of bit cells of a signal 20 read from the record carrier. In FIG. 2, this signal 20 is shown for the situation in which the pattern of marks 3 and areas 4 is scanned with a constant linear velocity. The length T of a bit cell corresponds with the period T of the data clock of the signal. In the track parts indicated by reference sign 21, a bit cell is represented by a track part with a length L1, while in the track part indicated by reference sign 22 a bit cell is represented by a track part with a length L2, which is shorter than length L1. In other words, the mean length of the marks 3 and areas 4 for the track parts 21 differs from the mean length of the marks 3 and areas 4 in the track parts 22. In the event that the track is scanned with a constant linear velocity and the data clock is recovered from the signal 20 read, the variations in the mean value of the length of the marks 3 and areas 4 results in variations of the frequency of the recovered data clock.

Figure 3:
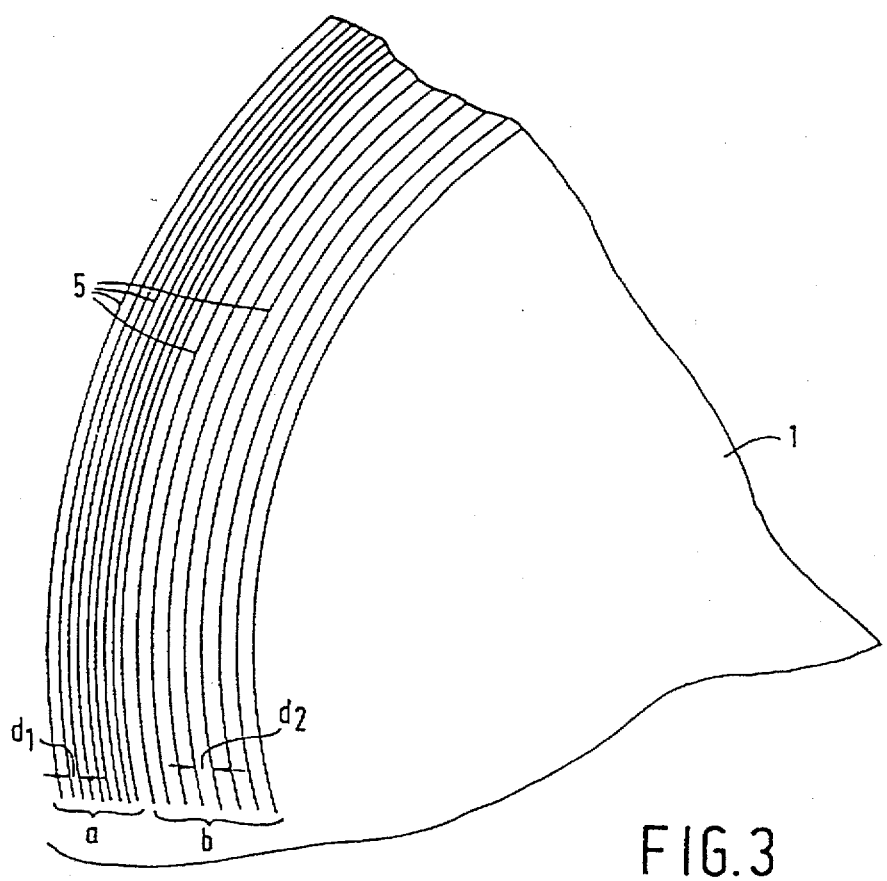

FIG. 3 shows a fifth embodiment of a record carrier for use in the information system according to the invention. In this embodiment, the tracks are divided in groups a and b. The track pitch d1 in group a, as well as the track pitch d2 of the tracks in group b, is constant with the respective group. The track pitch d2, however, is greater than the track pitch d1. This difference in track pitch can be easily detected when the tracks are scanned by a radiation beam as is described in detail in GB-PS 1,516,285, which is hereby incorporated in the description by reference. The presence of the variations in the track pitch can be easily detected when a scanning beam is moved in a radial direction over the record carrier 1.

Figure 5:
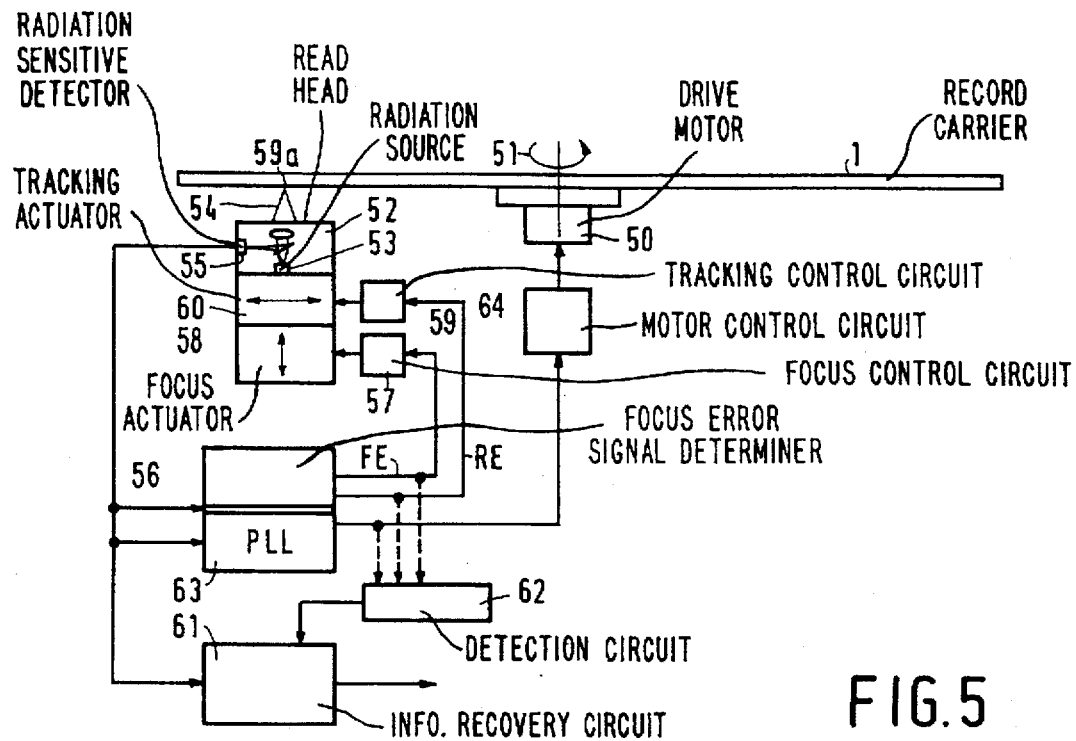

FIG. 5 shows an embodiment of an optical information system in accordance with the invention in more detail. The system is provided with a rotating drive motor 50 mechanically coupled with the record carrier 1 so as to cause a rotation of the record carrier about an axis 51. In rotating the record carrier, it is moved along a transducer in the form of an optical read head 52 of a usual type. The optical head 52 comprises a radiation source 53, for example, in the form of a semiconductor laser for generating a laser beam 54. The beam 54 is directed by an optical system of a usual type to a radiation sensitive detector 55 via the record carrier 1. The laser beam is modulated in accordance with the variations of the first and second parameters. These modulations are detected by the detector 55 and detection signals corresponding to these modulations are available at the output of the detector 55. The detection signals on the output of the detector 55 are supplied to a circuit 56 of a usual type which derives a focus error signal FE and a tracking error signal RE from these detection signals. The focus error signal FE is supplied to a focus control circuit 57 which derives from this focus error signal an energizing signal for a focus actuator 58 such that a focal point 59a of the beam 54 is maintained in a plane of the record carrier in which the optically detectably marks 3 are located. The detector 55, the circuit 56, the focus control circuit 57 and the focus actuator 58 form a focus servo system of usual type.

The tracking error signal RE is supplied to a tracking control circuit 59 which derives from the tracking error signal RE an energizing signal for a tracking actuator 60 arranged to move the beam 54 in a radial direction in response to the energizing signal so as to maintain the beam substantially directed to the center of the track 5. The detector 55, the circuit 56 and the tracking control circuit 59 form a tracking servo system of usual type. The detection signals at the output of the detector are also supplied to an information recovery circuit 61.

The playback apparatus is further provided with scanning velocity control device for maintaining the scanning velocity at a substantial constant value. The scanning velocity control device may comprise a circuit 63, for example, a phase locked loop circuit of usual type, for recovering the data clock from the detection signal at the output of the detector 55. The frequency of the data clock is a measure for the scanning velocity. A signal indicating the data clock frequency is supplied to a motor control circuit 64 for energizing the motor 50 such that the frequency of the recovered data clock is maintained at a substantial constant value. It is to be noted that the scanning velocity servo system can also be realized in other manners, for example, as often realized in compact disc players on the basis of the filling grade of a so-called FIFO-buffer in which the information read out is temporarily stored.

Figure 6:
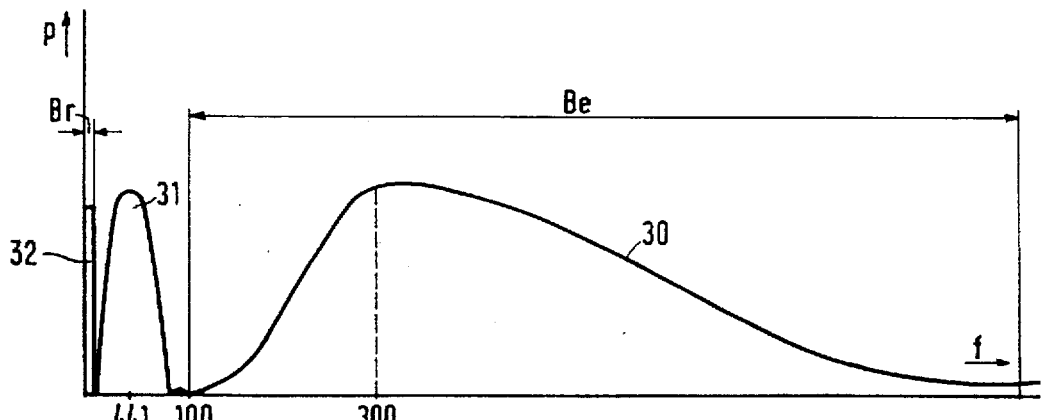
FIG. 6 shows the positions of the frequency spectra of different signals with respect to one another.

In the event that the record carrier 1 is of the type as shown in FIG. 1b, the track error signal RE exhibit a signal component which is caused by the radial wobble. For a detailed explanation of this phenomena, reference is made to EP-A-0,2-99,573 and EP-A-0,325,330, which are incorporated herewith by reference. The frequency of the radial wobble should be selected such that the frequency of the signal component caused by the wobble is situated outside the bandwidth of the tracking servo loop and outside the frequency spectrum of the information. FIG. 6 shows as illustration the position of the frequency spectrum 31 of the signal component caused by the radial wobble situated between the bandwidth 32 of the tracking servo and the frequency spectrum 30 of the information recorded on the record carrier.

The signal component in the tracking error signal RE caused by the radial wobble is detected by a detection circuit 62. This detection circuit 62 may be of a type as disclosed in detail in EP-A-0,299,573 and EP-A-0,325,330.

Figure 7:
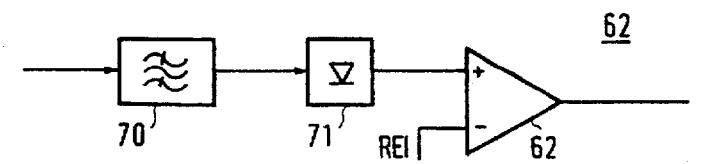

The radial wobble may be a wobble with a constant frequency and constant amplitude. In such case, the detection circuit may be of a type as shown in FIG. 7. The detection circuit shown in FIG. 7 comprises a band pass filter 70 tuned to the frequency of the signal component caused by the radial wobble. The input of the band pass filter 70 is coupled to the circuit 56 so as to receive the tracking error signal RE. The output of the band filter 70 is coupled to an input of a rectifying circuit 71 for rectifying the signal component filtered out by the filter 70. The rectified signal component is supplied to a comparator 72 for comparing the rectified signal with a reference value REF.

In the event that the rectified component exceeds the reference value REF, the comparator generates an enabling signal which is supplied to the information recovery circuit for enabling the recovery of the information from the detection signals at the output of the detector 55.

Only when the detection circuit 61 detects a signal component of a predetermined frequency caused by the radial wobble will the information recovery be enabled. When there is an absence of this component, the information recovery is disabled. This means that the information recorded on a record carrier without a radial wobble with the predetermined frequency cannot be recovered.

Instead of a radial wobble with a constant frequency and constant amplitude, it is preferred that radial wobbles exhibit a modulation which represents a code. Such modulation may be of a type as, for example, disclosed in EP-A-0,299,573 or a FM-modulation as disclosed in EP-A-0,325,330.

Figure 8:
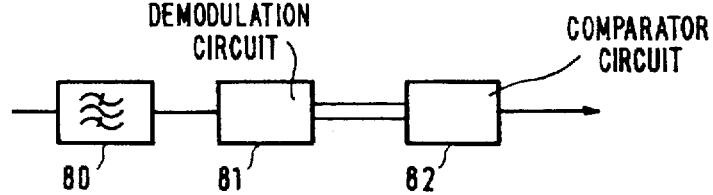

In the event that a modulated radial wobble is used, the detection circuit 62 may be of a type as disclosed in those EP-A-documents. FIG. 8 shows in principle such a detection circuit 62. This detection circuit comprises a band pass filter 80 tuned to the frequency of the radial wobble. The input of the filter 80 is coupled to the circuit 56 so as to receive the tracking error signal RE. The output of the filter 80 is supplied to a demodulation circuit 81 for recovering the code represented by the modulated wobble. The code recovered by the demodulation circuit 81 is supplied to a comparator circuit 82 for comparing the code recovered with a predetermined code. The comparator circuit 82 is of a type that generates an enabling signal for the recovery circuit 61 in the event that the code recovered by the demodulation circuit 81 corresponds with the predetermined code.

The information recovery circuit 61 may be of a usual type which may be enabled by an enabling signal.

Figure 9:
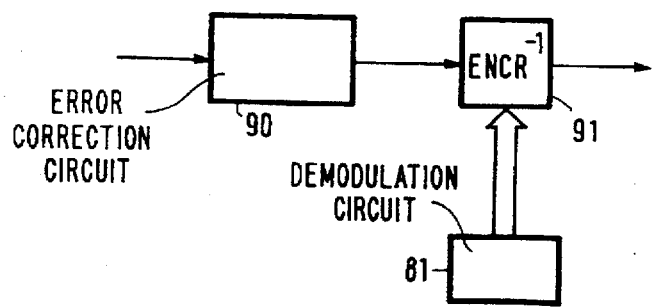
FIGS. 7, 8 and 9 show embodiments of detection circuits for use in the information system as shown in FIG. 5.

It may be preferable to record encrypted or scrambled information on the record carrier which can only be recovered using a predetermined encryption or descrambling key code. In that case, it is preferred that the descrambling or encryption code be represented by the modulation of the track wobble. The information recovery circuit should then be provided with a descrambling or a de-encryption circuit for de-encrypt or descramble the information using the code directly received from the demodulation circuit 81. An example of such information recovery circuit is shown in FIG. 9. The information recovery circuit comprises a demodulation and error correction circuit 90 of a usual type for the recovery of information which has been encoded, for example, in accordance with a Compact Disc standard. The output signal of the circuit 90 is supplied to a descrambling or de-encryption circuit 91 of a usual type which descrambles or de-encrypts the information in conformity with the code directly received from the demodulation circuit 81.

When copying Compact Discs, often a so-called recordable Compact Disc is used which is provided with a pregroove exhibiting a radial wobble which cause a signal component in the radial error signal with a frequency which substantially corresponds with a value of 22 kHz when the record carrier is scanned with a nominal scanning velocity of 1.2 to 1.4 meter per second. Such a recordable Compact Disc is disclosed in detail in EP-A-0,325,330, already mentioned.

In order to prevent a radial wobble copied from a Compact disc with a modulate radial wobble, it is preferred that the radial wobble on the compact Disc to be copied have a frequency which substantially corresponds with the frequency of the radial wobble of the pregroove on the recordable Compact Disc. In that case, the frequency spectra of both wobbles overlap and the wobbles cannot be distinguished from one another, any more.

The embodiments described in the preceding are suitable to be used in combination with record carriers which exhibit a track wobble as shown in FIG. 1b.

The same circuitry can be used with a record carrier such as the one shown in FIG. 1d. When using that type of record carrier, a signal component in the focus error signal is caused instead of in the tracking error signal. In that case, the focus error signal should be supplied to the detection circuit 62 instead of the tracking error signal RE.

In the event that a record carrier of the type shown in FIG. 2 is used, the frequency of the data clock recovered by circuit 63 exhibits variations. In that case, a signal indicative of these variations in the data clock frequency should be supplied to the detection circuit 62.

The detector 55, the circuit 63, the motor circuit 64 and the motor 50 form a scanning velocity control system. For proper operation, the variations in the data clock frequency should be situated outside the bandwidth of the scanning velocity servo.

In the preceding, the invention is described for use in combination of optical information systems. However, it is to be noted that in principle the invention is also applicable for other types of information systems such as magnetic information systems. In such systems, a magnetic record carrier may be provided with a wobbling track. Both the magnetic information pattern and the track wobble can be detected by the same magnetic read head.

We claim:

1. An information system, comprising:
    a record carrier having information marks along a track thereof and exhibiting:
        first variations caused by existence and non-existence of the information marks along the track, said first variations representing an information signal recorded on said record carrier, and
        second variations caused by variations associated with the track; and
    a playback apparatus including:
        transducer means for scanning said record carrier, said transducer means being adapted to detect said first variations and said second variations,
        recovery means coupled to said transducer means for recovering the information signal from said first variations,
        detection means for detecting whether said second variations exhibit a predetermined variation pattern on the basis of at least one signal, which is at least indicative of said second variations, originating from said transducer means, and
        enabling means for enabling said recovery means to recover the information signal when said detection means detects said predetermined variation pattern.

2. The system as claimed in claim 1, wherein said second variations exhibit a modulation pattern representing a code; and said detection means includes demodulation means for recovering said code on the basis of said at least one signal, and activation means for activating said enabling means when said code is recovered.

3. The system as claimed claim 2, wherein the information signal recorded on said record carrier is of a type which is recoverable by means of a predetermined type of data processing, said code indicating the predetermined type of data processing to be used for recovering the information signal, and said playback apparatus further includes means for setting said recovery means in a mode in which the predetermined type of data processing is performed when the information signal is recovered.

4. The system as claimed in claim 1, wherein said record carrier is of an optical readable type in which the existence and non-existence of the information marks along the track correspond to a pattern of optically detectable information marks alternating with intermediate areas arranged along the track and said transducer means includes a radiation sensitive detector, and means for directing a radiation beam on said radiation sensitive detector via said record carrier.

5. The information system as claimed in claim 4, further comprising servo control means for controlling the scanning in order to control at least one scanning parameter to a predetermined value, said servo control means operating on the basis of signal components within said at least one signal which are within a predetermined frequency bandwidth, wherein said second variations cause variations in said at least one signal which exhibit a frequency spectrum which is located outside the predetermined frequency bandwidth of operation of said servo control means and outside the frequency spectrum of said first variations.

6. The system as claimed in claim 5, wherein said servo control means includes tracking control means for controlling tracking, and said second variations are caused by variations in the track position in a direction transverse to the track direction.

7. The information system as claimed in claim 6, wherein said record carrier is a Compact Disc, and said second variations result in variations in said at least one signal with a frequency substantially corresponding to 22 kHz when the track is scanned with a scanning speed between 1.2 to 1.4 meter per second.

8. The system as claimed in claim 5, wherein said servo control means includes focus control means for maintaining a focal point of a scanning beam used to scan said record carrier substantially in the plane in which said optically detectable information marks and intermediate areas are located, and said second variations are caused by variations in the position of said plane.

9. The system as claimed in claim 1, wherein said second variations exhibit a modulation pattern representing a code, said detection means includes demodulation means for recovering said code on the basis of said at least one signal, and said enabling means enables said recovery means to recover the information signal when said code is a predetermined code.

10. The system as claimed in claim 9, wherein the information signal recorded on said record carrier is of a type which is recoverable by means of a predetermined type of data processing, said code being the predetermined code and indicating the predetermined type of data processing to be used for recovering the information signal, and said playback apparatus further includes means for setting said recovery means in a mode in which the predetermined type of data processing is performed when the information signal is recovered.

11. The system as claimed in claim 1, wherein the information signal recorded on said record carrier is of a type which is recoverable by means of a predetermined type of data processing, said second variations exhibit a modulation pattern representing a code indicating the predetermined type of data processing to be used for recovering the information signal, said detection means includes demodulation means for recovering said code on the basis of said at least one signal, and said playback apparatus further includes means for setting said recovery means in a mode in which the predetermined type of data processing is performed during recovery of the information signal.

12. A playback apparatus for recovering an information signal from a record carrier exhibiting first variations caused by existence and non-existence of information marks along a track thereof, which first variations represent the information signal, and second variations caused by variations associated with the track, the apparatus comprising:
    transducer means for scanning said record carrier, said transducer means being adapted to detect said first variations and said second variations,
    recovery means coupled to said transducer for recovering the information signal from said first variations,
    detection means for detecting whether said second variations exhibit a predetermined variation pattern on the basis of at least one signal, which is at least indicative of said second variations, originating from said transducer means, and
    enabling means for enabling said recovery means to recover the information signal when said detection means detects said predetermined variation pattern.

13. The apparatus as claimed in claim 12, wherein said second variations exhibit a modulation pattern representing a code; and said detection means includes demodulation means for recovering said code on the basis of said at least one signal, and activation means for activating said enabling means when said code is recovered.

14. The apparatus as claimed in claim 13, further comprising means for setting said recovery means in a mode in which a predetermined type of data processing indicated by said code is performed when the information signal is recovered.

15. The apparatus as claimed in claim 12, wherein said transducer means includes a radiation sensitive detector, and means for directing a radiation beam on said radiation sensitive detector via said record carrier.

16. The apparatus as claimed in claim 15, further comprising servo control means for controlling the scanning in order to control at least one scanning parameter to a predetermined value on the basis of an error signal derived from said at least one signal, and wherein said detection means detects whether said second variations exhibit the predetermined variation pattern on the basis of said error signal.

17. The apparatus as claimed in claim 16, wherein said servo control means includes tracking control means for controlling tracking on the basis of a tracking error signal derived from said at least one signal.

18. The apparatus as claimed in claim 16, wherein said record carrier is of an optical readable type in which the existence and non-existence of the information marks along the track correspond to a pattern of optically detectable information marks alternating with intermediate areas arranged along the track, and said servo control means includes focus control means for maintaining a focal point of a scanning beam used to scan said record carrier substantially in the plane in which said optically detectable information marks and intermediate areas are located on the basis of a focus error signal derived from said at least one signal.

19. The apparatus as claimed in claim 12, wherein said second variations exhibit a modulation pattern representing a code, said detection means includes demodulation means for recovering said code on the basis of said at least one signal, and the apparatus further comprises means for setting said recovery means in a mode in which a predetermined type of data processing indicated by said code is performed during recovery of the information signal.

20. The apparatus as claimed in claim 12, wherein said second variations exhibit a modulation pattern representing a code, said detection means includes demodulation means for recovering said code on the basis of said at least one signal, and said enabling means enables said recovery means to recover the information signal when said code is a predetermined code.

21. The apparatus as claimed in claim 20, wherein said code is said predetermined code, and the apparatus further comprises means for setting said recovery means in a mode in which a predetermined type of data processing indicated by said code is performed during recovery of the information signal.

22. A playback apparatus for recovering an information signal from a record carrier exhibiting at least first variations caused by existence and non-existence of information marks along a track thereof, which first variations represent the information signal, the apparatus comprising:
    transducer means for scanning said record carrier, said transducer means being adapted to detect said first variations;
    recovery means coupled to said transducer for recovering the information signal from said first variations,
    detection means for detecting whether said record carrier exhibits second variations caused by variations associated with the track, and enabling means for enabling said recovery means to recover the information signal when said detection means detects said second variations.

23. The apparatus as claimed in claim 22, wherein said second variations exhibit a modulation pattern representing a code, said detection means includes demodulation means for recovering said code on the basis of said at least one signal, and the apparatus further comprises means for setting said recovery means in a mode in which a predetermined type of data processing indicated by said code is performed during recovery of the information signal.

24. A playback apparatus for recovering information from a record carrier exhibiting first variations of a first physical parameter of said record carrier corresponding to said information, and second variations of a second physical parameter of said record carrier, said first physical parameter and said second physical parameter differing from each other, the apparatus comprising:

transducer means for scanning said record carriers, said transducer means being adapted to detect said first variations and said second variations and including a radiation sensitive detector and means for directing a radiation beam on said radiation detector via said record carrier, servo control means for controlling the scanning in order to control at least one scanning parameter to a predetermined value on the basis of an error signal, which is at least indicative of said second variations, originating from said transducer means, recovery means coupled to said transducer for recovering the information from said first variations, detection means for detecting whether said second variations exhibit a predetermined variation pattern on the basis of the error signal, and enabling means for enabling said recovery means to recover the information when said detection means detects said predetermined variation pattern.

25. An information system, comprising:

a record carrier of an optical readable type exhibiting:

first variations of a first physical parameter of said record carrier, said first variations corresponding to information recorded on said record carrier as a pattern of optically detectable marks alternating with intermediate areas arranged along a track thereof, and second variations of a second physical parameter of said record carrier, said second physical parameter differing from said first physical parameter;

a playback apparatus having:

transducer means for scanning said record carrier, said transducer means being adapted to detect said first variations and said second variations, and including a radiation sensitive detector and means for directing a radiation beam on said radiation sensitive detector via said record carrier, recovery means coupled to said transducer for recovering the information from said first variations, detection means for detecting whether said second variations exhibit a predetermined variation pattern on the basis of at least one signal, which is at least indicative of said second variations, originating from said transducer means, and enabling means for enabling said recovery means to recover the information when said detection means detects said predetermined variation pattern; and servo control means for controlling the scanning in order to control at least one scanning parameter to a predetermined value, which servo control means operates on the basis of signal components within said at least one signal which are within a predetermined frequency bandwidth;

wherein said second variations cause variations in said at least one signal which exhibit a frequency spectrum which is located outside the predetermined frequency bandwidth of operation of said servo control means and outside the frequency spectrum of said first variations.

* * * * *